United States Patent
McGuire

(10) Patent No.: US 9,154,426 B2
(45) Date of Patent: Oct. 6, 2015

(54) LOW-LATENCY HOLE PUNCHING

(75) Inventor: Rory L. McGuire, Albuquerque, NM (US)

(73) Assignee: APPLE INC., Cupertino, CA (US)

( * ) Notice: Subject to any disclaimer, the term of this patent is extended or adjusted under 35 U.S.C. 154(b) by 464 days.

(21) Appl. No.: 13/285,194

(22) Filed: Oct. 31, 2011

(65) Prior Publication Data

US 2013/0111043 A1   May 2, 2013

(51) Int. Cl.
- *G06F 15/173* (2006.01)
- *H04L 12/801* (2013.01)
- *H04L 29/08* (2006.01)
- *H04L 29/12* (2006.01)

(52) U.S. Cl.
CPC .............. *H04L 47/18* (2013.01); *H04L 61/256* (2013.01); *H04L 61/2514* (2013.01); *H04L 61/2557* (2013.01); *H04L 67/104* (2013.01); *H04L 47/14* (2013.01); *H04L 61/2575* (2013.01); *H04L 61/2589* (2013.01)

(58) Field of Classification Search
CPC ........ H04L 45/04; H04L 45/74; H04L 49/351
USPC .................. 709/221, 223, 228, 230, 245, 246
See application file for complete search history.

(56) References Cited

U.S. PATENT DOCUMENTS

| | | | |
|---|---|---|---|
| 6,502,135 B1 | 12/2002 | Munger et al. | |
| 7,418,504 B2 | 8/2008 | Larson et al. | |
| 7,490,151 B2 | 2/2009 | Munger et al. | |
| 7,921,211 B2 | 4/2011 | Larson et al. | |
| 8,051,181 B2 | 11/2011 | Larson et al. | |
| 8,504,697 B2 | 8/2013 | Larson et al. | |
| 2003/0084133 A1* | 5/2003 | Chan et al. | 709/222 |
| 2004/0139228 A1* | 7/2004 | Takeda et al. | 709/245 |
| 2007/0097990 A1* | 5/2007 | Ozaki et al. | 370/395.52 |
| 2008/0126528 A1* | 5/2008 | Takeda et al. | 709/223 |

OTHER PUBLICATIONS

Reto Gantenbein, VirtualMesh: An Emulation Framework for Wireless Mesh Networks with OMNeT++, Fall 2009, RVS Seminar, University of Bern.*
"VirtualMesh: An Emulation Framework for Wireless mesh netwroks with OMNeT++"—SAGE Pub, Jul. 2010 http://cds.unibe.ch/research/pub_files/te10.pdf.*

* cited by examiner

*Primary Examiner* — Randy Scott
(74) *Attorney, Agent, or Firm* — Park, Vaughan, Fleming & Dowler LLP

(57) ABSTRACT

Described is a system for establishing a network connection between electronic devices in a network. In the described embodiments, a first electronic device is configured to determine that a relay server is being used to send packets to and receive packets from a second electronic device. In parallel with continuing to send packets to and receive packets from the second electronic device using the relay server, the first electronic device is configured to perform operations to establish a peer to peer network connection with the second electronic device. When the peer to peer network connection has been established, the first electronic device is configured to stop using the relay server to send packets to and receive packets from the second electronic device, and instead use the peer to peer network connection with the second electronic device to send packets to and receive packets from the second electronic device.

30 Claims, 7 Drawing Sheets

LOW-LATENCY HOLE PUNCHING

BACKGROUND

1. Field

The described embodiments relate to electronic devices. More specifically, the described embodiments relate to the establishment of network connections between electronic devices.

2. Related Art

Many modern electronic devices include a networking subsystem that is used to communicate with other electronic devices. For example, these electronic devices can include networking subsystem with a cellular network interface (UMTS, LTE, etc.), a wireless network interface (e.g., a wireless network such as described in the Institute of Electrical and Electronics Engineers (IEEE) standards 802.11), and/or another type of wireless interface.

In order to configure an electronic device to communicate peer to peer with another device using a given network interface, a number of operations are typically performed to enable the devices to find each other, determine how communication is to be formatted, determine security options, and initiate direct communication. These operations are generally performed in sequence, with each operation requiring a number of communications to make a trip between the electronic devices. For this reason, configuring electronic devices to communicate peer to peer with other electronic devices can be time consuming, which can delay the transmission of useful data (e.g., data from an application on an electronic device awaiting transmission to the other electronic device) between the electronic devices.

BRIEF DESCRIPTION OF THE FIGURES

In the figures, like reference numerals refer to the same figure elements.

DETAILED DESCRIPTION

Figure 1:
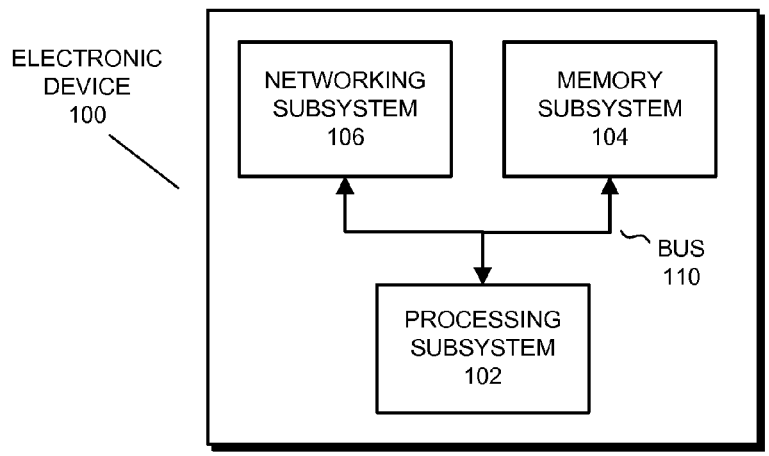
FIG. 1 presents a block diagram illustrating an electronic device in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

Overview

The described embodiments perform operations for establishing a network connection that is used for communicating packets (data packets, control packets, etc.) between electronic devices (interchangeably, "devices") on a network, at least one of which may be located behind at least one network address translator (NAT). In the described embodiments, the electronic devices can include any electronic device with a networking subsystem that can communicate with another electronic device using a network connection.

As is known in the art, a NAT is a device that is coupled between a first network and a second network to serve as an interface to the first network for a set of devices at a set of private IP addresses on the second network. Generally, the NAT is located at an IP address on the first network, and can send packets from and receive packets at the IP address and a port on the first network for the devices on the second network. The NAT includes a mapping (or translation) of the private IP addresses and ports of the devices on the second network that enables the NAT to determine how to route packets received on the first network to the devices on the second network. In some embodiments, the first network is the Internet, an intranet, or another network.

In the described embodiments, because the NAT interfaces between the networks, devices on the second network are hidden from devices on the first network. Hence, a device on the first network cannot use an IP address and port of a device on the second network to communicate directly with the device on the second network. Instead, when transmitting packets to a target device on the second network, a device on the first network sends the packets to the NAT (i.e., at the IP address and port of the NAT on the first network), and the NAT forwards the packets to the target device on the second network. More specifically, the NAT receives the packets on the first network, uses the mapping to determine the IP address and port of the electronic device on the second network to which the packets are actually directed, alters the address and port information in the packet accordingly, and forwards the packets on the second network.

In the described embodiments, to enable communication between the devices when one or more NATs is located between the devices, a relay server on the first network can be used to relay packets between the devices. Generally, a relay server is a server that is located at a well-known IP address and port on the first network. Electronic devices initially establish a TCP session with the relay server at the well-known IP address (e.g., by looking up the IP address using a well-known hostname) and port. After establishing the TCP session, the electronic devices register with the relay server. Registering a given electronic device comprises negotiating an identifier, such as another IP address, with the relay server, and recording that IP address and information about the TCP connection in a memory in the relay server to enable delivery of subsequent packets to the device from the relay server.

After registering with the relay server, an electronic device can communicate specially-formatted packets to the relay server that are destined for another electronic device at the other device's IP address and port on the second network, and the relay server can use the record of the other electronic device to forward/relay the packets to the other electronic device. This can mean that the relay server forwards the packets to the NAT at the NAT's IP address and port on the first network, and the NAT subsequently forwards the packets to the device on the second network. In some embodiments, communicating using the relay server follows at least some of the guidelines described in Request for Comments (RFC) 5766, "Traversal Using Relays Around NATs" (TURN), by the Internet Engineering Task Force (IETF), which is available at the IETF website on the Internet, and which is herein incorporated by reference.

However, although communication between devices can be achieved using the relay server, relying on a relay server for communication between devices can be inefficient because relay servers may need to be responsible for handling communication between very large numbers of devices, requiring the relay server to have significant processing power and high-bandwidth, high-availability network connections.

In the described embodiments, given knowledge about the IP addresses and ports of NATs between the devices, the devices can also communicate directly with one another (e.g., without relaying packets through the relay server) using a peer to peer network connection. To enable communication using a peer to peer network connection, the devices each first send an inquiry to an address resolution server on the first network to determine IP addresses and ports on the first network to which packets should be sent to ensure that they reach the electronic device. (Note that the "first network" is a network that the devices have in common, i.e., to which both of the devices are either directly coupled or indirectly coupled through one or more NATs, which, as indicated above, can be, e.g., the Internet or an intranet.) If the electronic device is located behind at least one NAT, the address resolution server returns a response indicating the IP address and port of the NAT on the first network. Otherwise, if the device is coupled directly to the first network, the address resolution server returns a response that indicates the IP address and port of the electronic device itself on the first network. In some embodiments, when sending the inquiry to the address resolution server to determine the IP addresses and ports on the first network, the devices follow at least some of the guidelines described in Request for Comments (RFC) 5389, "Session Traversal Using Relays Around NAT" (STUN), by the Internet Engineering Task Force (IETF), which is available at the IETF website on the Internet, and which is herein incorporated by reference. (Note that, although we describe embodiments where the devices must discover their IP addresses and ports on the first network, in some embodiments, one or both of the devices can already have knowledge of its IP address and port on the first network. For example, in some embodiments, an operating system in a device can know the device's IP address and port on the first network. In these embodiments, the address resolution step can be skipped for the given electronic device.)

Although embodiments are described where a NAT is located between at least one of the devices and the first network, in some embodiments there is no NAT located between either of the devices and the first network (i.e., the devices are directly coupled to the same network). These embodiments can function in a similar way to the embodiments where a NAT is located between at least one of the devices and the first network.

Next, using the IP addresses and ports for the devices, the devices begin a process for establishing a peer to peer network connection between the devices. In some embodiments, this process includes using the relay server to send a message from each electronic device to the other electronic device to indicate potential IP addresses and ports for communicating with the electronic device. (Note that sending a "message" generally includes sending one or more control and/or data packets that contain data in a predetermined format.) The devices then send test messages to the other device at each of the indicated IP addresses and ports until one is found for which communication is successful. In some embodiments, when determining and testing the IP addresses and ports to enable communication with another device, the devices follow at least some of the guidelines described in Request for Comments (RFC) 5245, "Interactive Connectivity Establishment" (ICE), by the Internet Engineering Task Force (IETF), which is available at the IETF website on the Internet, and which is herein incorporated by reference.

Assuming that the IP address and ports testing operation succeeds (and hence the devices each know an IP address and port for communicating with the other device), the devices send messages to one another to establish the actual communication session, including sending various messages to establish a UDP/TCP/IP-in-IP session between the devices, to configure communication formats/security/encryption parameters for the communication session (e.g., exchanges IPsec messages), etc. Upon completing these operations, the network connection between the devices is configured, and the devices can use the peer to peer network connection to communicate directly with one another (i.e., without the assistance of the relay server). Note that although the devices are described as "communicating directly" with one another using the peer to peer network connection, one or more devices (e.g., routers, switches, repeaters, and/or other network devices) can be used when exchanging communications between the devices using the peer to peer network connection.

The described embodiments improve on existing systems by using the relay server to communicate packets (i.e., data packets, control packets, etc.) between the devices initially, but also, in parallel with using the relay server to communicate packets, performing the operations to establish a peer to peer network connection between the devices so that direct peer to peer communication can be commenced, and the devices can stop using the relay server. This means that the devices are not either bound to using the inefficient relay server entirely, or bound to performing all the operations for establishing the peer to peer network connection between the devices before the desired communication packets can actually start flowing between the devices. In this way, in the described embodiments, the desired communication packets are flowing between the devices a larger proportion of the time and so some of the latency of existing systems is avoided. (Note that "the desired communication packets" are communication packets flowing between, e.g., an application executing on the first device and an application executing on the second device, but are generally not the packets required to establish the communication session.)

In addition, because the peer to peer network connection can be lost when the devices have not sent a packet using the peer to peer network connection for longer than a specified timeout period, in existing systems, the devices can again use the relay server to exchange the desired communication packets, or can restart the process for establishing the network connection between the devices, which means that communication of the desired communication packets is again delayed, awaiting the completion of the establishment process. However, in an improvement over these existing systems, the devices in the described embodiments can use the relay server to communicate packets (i.e., data packets, control packets, etc.) between the devices after the peer to peer network connection is lost, but also, in parallel with using the relay server to communicate packets, perform the operations to establish a peer to peer network connection between the devices so that direct peer to peer communication can be commenced, and the devices can stop using the relay server. Thus, the devices can dynamically detect when the relay server is being used to exchange the desired communication packets, and can, in parallel with the continued exchange of the desired communication packets, start the process for establishing the peer to peer network connection.

In existing devices, operations for establishing a peer to peer network connection occur at the application level (i.e., at layer 7 of the OSI model), and hence applications need to include mechanisms for managing the establishment of the peer to peer network connection. The described embodiments improve on existing systems in that an IP layer (i.e., at layer 3 of the OSI model) in the devices (e.g., an operating system and/or a virtual interface daemon) handles the dynamic recognition of the use of the relay server and the establishment of the peer to peer network connection. Thus, applications need not control/manage the type of connection that is being used to exchange the desired communication packets with another device.

Note that "hole punching" as used in the title of this application is a term of art used to describe the operations performed to enable an electronic device to communicate with another electronic device when one or more of the devices is behind a NAT. Thus, the described embodiments can be considered to perform hole-punching operations upon establishing the network connection with the relay server and using the relay server to communicate packets, and upon establishing the peer to peer connection and using the peer to peer network connection to communicate packets.

Electronic Device

FIG. 1 presents a block diagram illustrating electronic device 100 in accordance with the described embodiments. Electronic device 100 includes processing subsystem 102, memory subsystem 104, and networking subsystem 106.

Processing subsystem 102 includes one or more devices configured to perform computational operations. For example, processing subsystem 102 can include one or more microprocessors, application-specific integrated circuits (ASICs), microcontrollers, and/or programmable-logic devices.

Memory subsystem 104 includes one or more devices for storing data and/or instructions for processing subsystem 102 and networking subsystem 106. For example, memory subsystem 104 can include dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 includes one or more devices configured to couple to and communicate on a wired and/or wireless network (i.e., to perform network operations). For example, networking subsystem 106 can include a Bluetooth™ networking system, a cellular networking system (e.g., a 3G/4G network such as UMTS, LTE, etc.), a universal serial bus (USB) networking system, a Wi-Fi networking system, a networking system based on the standards described in IEEE 802.11, an Ethernet networking system, and/or another networking system.

Networking subsystem 106 includes processors, controllers, radios/antennas, sockets/plugs, and/or other devices used for coupling to, communicating on, and handling data and events for each supported networking system. In the following description, we refer to the mechanisms used for coupling to, communicating on, and handling data and events on the network for each network system collectively as the "interface" or "network interface" for the network system.

Within electronic device 100, processing subsystem 102, memory subsystem 104, and networking subsystem 106 are coupled together using bus 110. Bus 110 is an electrical, optical, or electro-optical connection that the subsystems can use to communicate commands and data among one another.

Although only one bus 110 is shown for clarity, different embodiments can include a different number or configuration of electrical, optical, or electro-optical connections between the subsystems.

Although shown as separate subsystems in FIG. 1, in some embodiments, some or all of a given subsystem can be integrated into one or more of the other subsystems in electronic device 100. Although alternative embodiments can be configured in this way, for clarity we describe the subsystems separately.

Electronic device 100 can be (or can be included in) any device with at least one network interface. For example, electronic device 100 can be (or can be included in) a desktop computer, a laptop computer, a server, a media player, an appliance, a subnotebook/netbook, a tablet computer, a cellular phone, a piece of testing equipment, a network appliance, a set-top box, a personal digital assistant (PDA), a smart phone, a toy, a controller, or another device.

Although we use specific components to describe electronic device 100, in alternative embodiments, different components and/or subsystems may be present in electronic device 100. For example, electronic device 100 may include one or more additional processing subsystems 102, memory subsystems 104, and/or networking subsystems 106. Additionally, one or more of the subsystems may not be present in electronic device 100. Moreover, in some embodiments, electronic device 100 may include one or more additional subsystems that are not shown in FIG. 1. For example, electronic device 100 can include, but is not limited to, a display subsystem for displaying information on a display, a data collection subsystem, an audio and/or video subsystem, an alarm subsystem, a media processing subsystem, and/or an input/output (I/O) subsystem.

Network Environment

Figure 2:
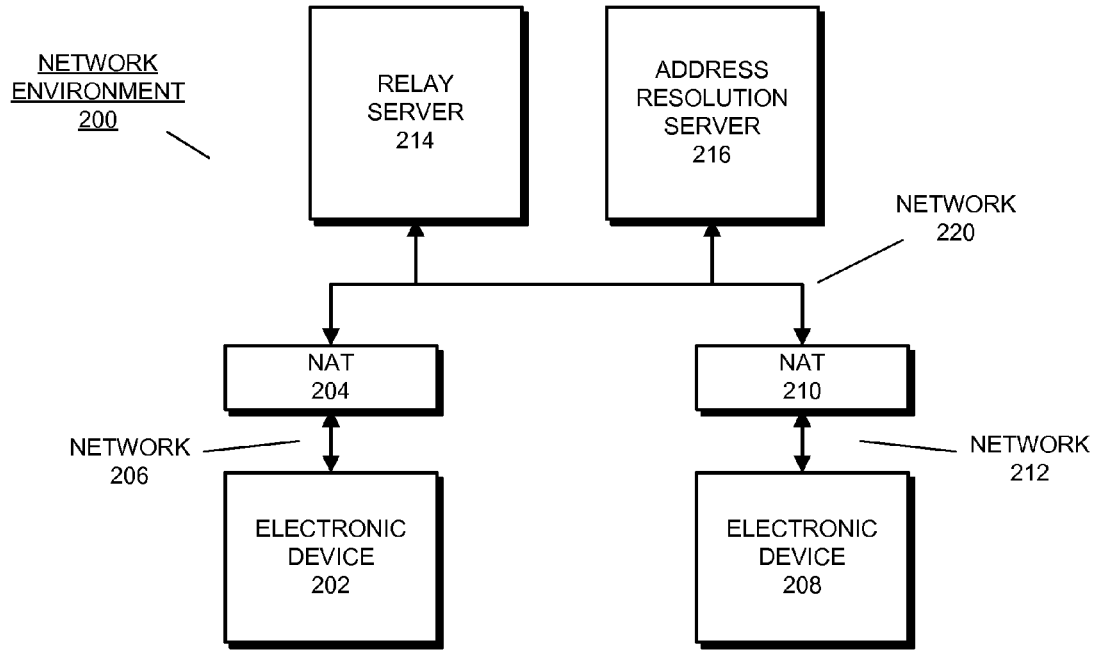
FIG. 2 presents a block diagram illustrating a network environment in accordance with the described embodiments.

FIG. 2 presents a block diagram illustrating a network environment 200 in accordance with the described embodiments. As can be seen in FIG. 2, electronic device 202 is coupled to network address translator (NAT) 204 via network 206, and electronic device 208 is coupled to NAT 210 via network 212. NATs 204 and 210 are additionally coupled to relay server 214 and address resolution server 216 via network 220.

Networks 206, 212, and 220 are electronic communication networks. Generally, networks 206, 212, and 220 can be any type of network that enables electronic, optical, or electro-optical communication of packets (data packets, control packets, etc.) between the electronic devices coupled to the network. For example, networks 206, 212, and 220 can comprise cellular networks (e.g., 3G/4G networks such as UMTS, LTE, etc.), Wi-Fi networks, networks based on the standards described in Institute for Electrical and Electronic Engineers (IEEE) 802.11, Ethernet networks, wired telephone networks, and/or other types or combinations of types of wired and/or wireless networks. In some embodiments, network 220 is the Internet or is an intranet.

In some embodiments, one or both of electronic devices 202 and 208 include the subsystems shown in electronic device 100. However, electronic devices 202 and 208 may comprise different numbers or types of subsystems. Generally, each of the electronic devices comprises at least a networking subsystem with an interface that enables each of the electronic devices to communicate on the corresponding network.

NATs 204 and 210 are network address translators. Generally, NATs 204 and 210 translate between an address space comprising one or more IP addresses on a given network (e.g., network 206) and one or more IP addresses in another address space on another network (e.g., network 220). (For convenience, the IP addresses on network 220 can be described as "public" addresses, and the IP addresses on network 206 can be described as "private" addresses, but in the described embodiments either or both sets of addresses can be "public" or "private.") Using NAT 204 as an example, NAT 204 has a public IP address on the network 220, and electronic device 202 has a private IP address on network 206.

When communication packets are transmitted from electronic device 202 to network 206 for delivery to a device on network 220, NAT 204 receives the communication packets, which include the private IP address and port of electronic device 202, alters the IP address and port information in the received packets to the public IP address and a port of NAT 204, and forwards the packets onto network 220 for delivery to a destination (e.g., for delivery to relay server 214 or NAT 210). When receiving packets at NAT 204's public IP address and a port on network 220 that are destined for electronic device 202, NAT 204 determines that the packets are destined for electronic device 202 (e.g., by reviewing information within the packets). Based on this determination, NAT 204 looks up electronic device 202's private IP address and port in a translation table; updates the IP address and port information in the packets to the private IP address and port of electronic device 202; and forwards the packets to electronic device 202 on network 206. Although we provide this simplified description of a function performed by NAT 204, NATs 204 and 210 can perform other functions. Generally, the functions performed by NATs 204 and 210 are known in the art, and hence are not described in more detail.

Relay server 214 is an intermediate host that acts as a relay for packets being transferred between devices on network 220. Generally, relay server 214 is located at a well-known IP address and port on network 220. As indicated above, in the described embodiments, devices establish a TCP session with relay server 214 at the well-known IP address and port. After establishing the TCP session, the devices register with relay server 214. Registering the devices comprises negotiating an identifier, such as another IP address, with the relay server, and recording that IP address and information about the TCP connection in a memory in relay server 214.

Electronic devices that have registered with relay server 214 can send specially-formatted packets to relay server 214 that comprise communication packets that are to be sent to another registered device. Relay server 214 uses information in the specially-formatted packet and the record of registered devices to determine a device (e.g., an electronic device or a NAT) to which the communication packets are to be forwarded. Relay server 214 then forwards the communication packets to the other registered device. As described above, in some embodiments, communicating using relay server 214 follows at least some of the guidelines described in Request for Comments (RFC) 5766, *"Traversal Using Relays Around NATs"* (TURN).

Address resolution server 216 is a host at a well-known IP address and port on network 220 that resolves IP addresses and ports for devices communicating on network 220. Address resolution server 216 can receive inquiry packets from electronic devices and return responses which indicate the IP address and port on network 220 from which the inquiry was sent. In cases where the electronic device is coupled to network 220, the inquiry returns the IP address and port of the device itself. However, in cases where one or more NATs are coupled between the electronic device and network 220, the inquiry returns an IP address and port on network 220 of the NAT coupled to network 220 (i.e., of the NAT closest to address resolution server 216). For example, given an inquiry that is sent from electronic device 202, the inquiry response would return the IP address and port of NAT 204 on network 220. The IP address and port of the NAT closest to address resolution server 216 is sometimes called the "reflexive transport address." As described above, in some embodiments, when sending the inquiry to address resolution server 216 to determine the IP addresses and ports on the first network, the electronic devices follow at least some of the guidelines described in Request for Comments (RFC) 5389, *"Session Traversal Using Relays Around NAT"* (STUN).

Although we describe the network environment shown in FIG. 2 as an example, in alternative embodiments, different numbers or types of devices may be present in network environment 200. For example, in some embodiments, one or more of the NATs is not present, and the corresponding electronic device 202 and/or 208 is coupled directly to network 220. Alternatively, one or more additional NATs (not shown) may be located between an electronic device and network 220. As another example, one or more relay servers 214 and/or address resolution servers may be present on network 220.

Operating System

Figure 3:
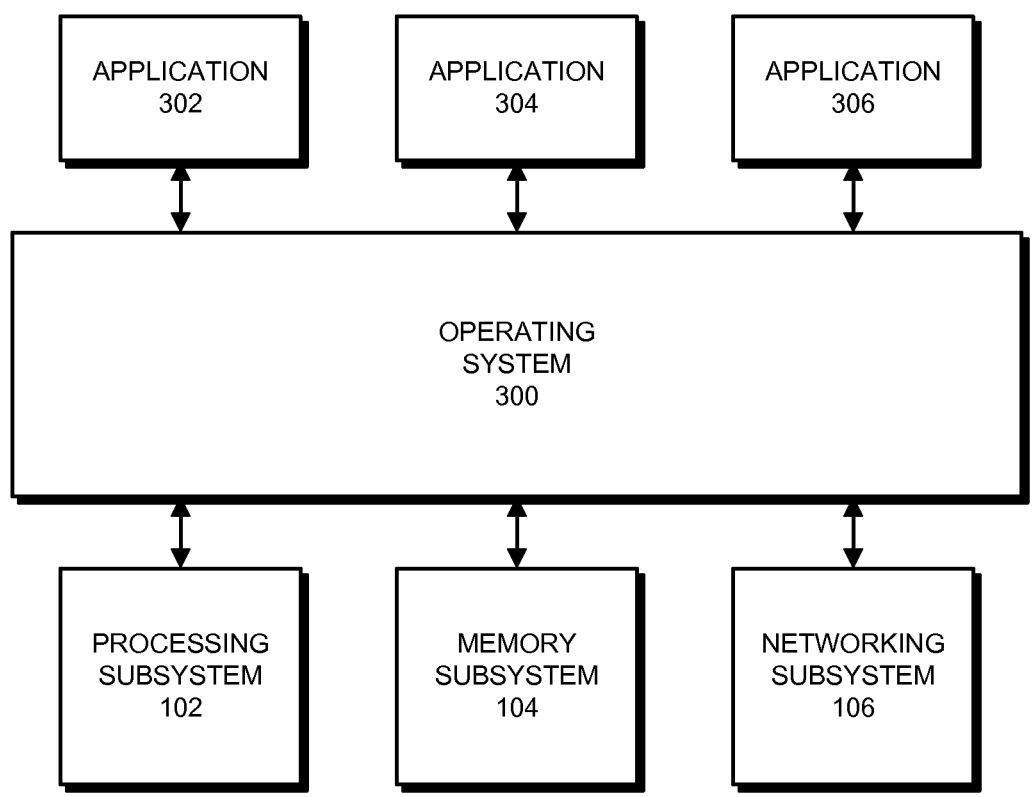
FIG. 3 presents a block diagram illustrating an operating system in accordance with the described embodiments.

FIG. 3 presents a block diagram illustrating an operating system 300 in accordance with the described embodiments. In some embodiments, operating system 300 is stored (as program code) in memory subsystem 104 and executed by processing subsystem 102.

Generally, operating system 300 serves as an intermediary between system hardware in electronic device 100 (e.g., subsystems 102-106) and applications executed by processing subsystem 102, such as applications 302-306 (which can be, for example, an email application, a web browser, and a game application). For example, operating system 300 can be, but is not limited to being, the OS X operating system from Apple Inc. of Cupertino, Calif.; the FreeBSD operating system from The FreeBSD Foundation of Boulder, Colo.; or another operating system. Operating systems and their general functions are known in the art and hence are not described in detail.

In the following description, we describe the embodiments using the "kernel" to refer to operating system 300. The kernel includes the core portions of operating system 300 and provides a low-level abstraction layer for the system hardware in electronic device 100 that applications 302-306 can use to access and/or control the system hardware to perform their functions.

To manage the transfer of packets to and from applications in electronic device 100 using an appropriate interface in networking subsystem 106, operating system 300 maintains one or more network protocol stacks (not shown) that each includes a number of logical layers. For example, the operating system can maintain an Internet protocol stack, which includes the link, Internet, transport, and application layers. As another example, the operating system can maintain a protocol stack based on the OSI model, which includes the application, presentation, session, transport, network, datalink, and physical layers. At corresponding layers of the protocol stack, the operating system includes control mechanisms and data structures for performing the functions associated with the layer. The functions associated with each of the layers in the protocol stacks are known in the art and hence are not described in detail.

Network Connection Data Maintained by the Operating System

In the described embodiments, operating system 300 includes network connection data 406 (see FIG. 4), which comprises records, information, and/or data for monitoring, configuring, and/or controlling the operation of the network systems in networking subsystem 106. For example, in some embodiments, operating system 300 includes interface data structures that are used to keep records for the network interfaces in networking subsystem 106 (e.g., Ethernet interfaces, cellular interfaces, Bluetooth™ interfaces, Wi-Fi interfaces, etc.). Operating system 300 can also include route data structures that are used to keep a record of route information to enable the operating system 300 to select an appropriate network interface for transmitting packets to a given destination. The records, information, and data in network connection data 406 are generally known in the art and hence are not described in detail.

Figure 4:
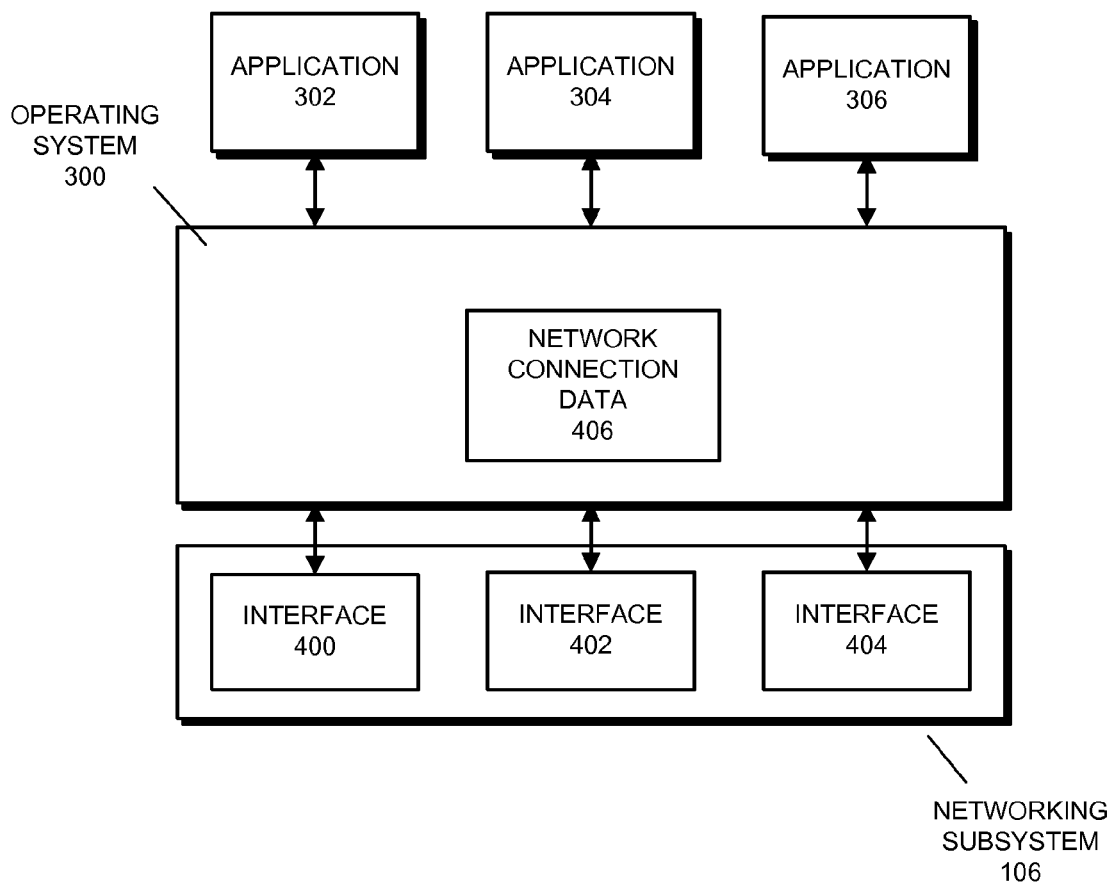
FIG. 4 presents a block diagram illustrating an exemplary networking subsystem with a set of interfaces in accordance with the described embodiments.

FIG. 4 presents a block diagram illustrating an exemplary networking subsystem 106 with a set of interfaces in accordance with the described embodiments. As can be seen in FIG. 4, networking subsystem 106 includes interfaces 400-404, which can be, for example, a Bluetooth™ interface, an cellular interface, and a Wi-Fi wireless network interface, respectively. As described above, applications 302-306 can be, for example, an email application, a web browser, and a game application, respectively, that each use routes in operating system 300 and a corresponding interface 400-404 in networking subsystem 106 to transfer data packets to other entities.

Route Object and Virtual Interface Daemon

Figure 5:
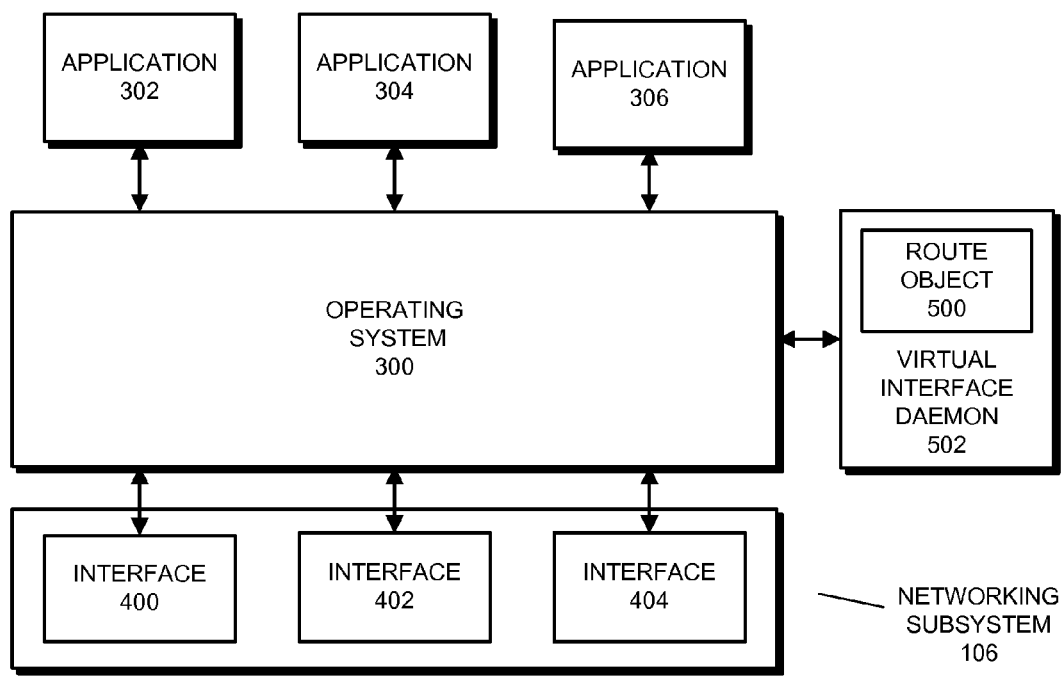
FIG. 5 presents a block diagram illustrating a route object and a virtual interface daemon in accordance with the described embodiments.

FIG. 5 presents a block diagram illustrating a route object 500 and a virtual interface daemon 502 in accordance with the described embodiments. Route object 500 and virtual interface daemon 502 are mechanisms in the application space (as versus the kernel space) that perform operations for, among other things, using relay server 214 to relay packets for the corresponding device (e.g., electronic device 202 or 208), and for dynamically forming and using peer to peer network connections between devices in the described embodiments. Generally, route object 500 and a virtual interface daemon 502 are stored (as program code) in memory subsystem 104 and executed by processing subsystem 102. In the following description, electronic device 202 is used as an example; however, electronic device 208 functions similarly.

Virtual interface daemon 502 is a daemon executed by processing subsystem 102 that dynamically creates network connections (and corresponding routes in operating system 300), and manages the transmission of packets from some applications in electronic device 202. Generally, virtual interface daemon 502 appears as an interface to operating system 300, and hence operating system can send packets to virtual interface daemon 502 as if they were to be transmitted from electronic device 202. However, virtual interface daemon 502 does not actually transmit packets, but instead performs processing operations on the packets and returns the packets to operating system 300 for processing in the network stack and eventual transmission using an actual interface 400-404 in electronic device 202.

In the described embodiments, when electronic device 202 starts, operating system 300 starts virtual interface daemon 502. Virtual interface daemon 502 then uses the above-described process to establish a network connection (e.g., a TCP session) with and register with relay server 214, and adds a route to operating system 300's route records that is used to direct packets from operating system 300 to virtual interface daemon 502 for processing. This route can be used to ensure that packets sent by some applications are forwarded to virtual interface daemon 502 for processing before being transmitted from electronic device 202. Virtual interface daemon 502 can also subsequently add (or update) other routes to the route records in operating system 300. For example, in the described embodiments, virtual interface daemon 502 can perform some or all of the above-described process for establishing the peer to peer network connection, which may comprise creating or updating a corresponding route in operating system 300.

In the described embodiments, some of applications 302-306 send packets to operating system 300 (i.e., the kernel) with destination IP addresses and ports for processing in the network stack, and eventual transmission from electronic device 202. Based on the destination IP address and port, and using the route information maintained by operating system 300, operating system 300 determines that the packets are to be sent from the virtual interface, and forwards the packets to virtual interface daemon 502. However, virtual interface daemon 502 does not transmit packets, but instead updates the packets and forwards the updated packets back to operating system 300 for processing in the network stack and eventual transmission from a different interface. In this way, applications 302-306 can simply send packets to operating system 300 without knowledge of what interface/route is eventually used to transmit the packets, and virtual interface daemon 502 can dynamically manage the establishment and maintenance of the connection information used to transmit the packets. This mechanism helps to enable the transition from initially using relay server 214 to communicate packets to using the peer to peer network connection to communicate packets.

As briefly described above, in addition to establishing the connection to relay server 214, virtual interface daemon 502 performs some or all of the operations for establishing the peer to peer network connection. Specifically, virtual interface daemon 502 can perform some or all of the above-described address resolution, address testing, and connection particular establishment (UDP bring-up, IPsec, etc.). In parallel with establishing the peer to peer network connection between the devices, virtual interface daemon 502 can continue to forward packets destined for the other device to operating system 300 to be transmitted to relay server 214 for relaying to the other device. In other words, virtual interface daemon 502 can ensure that packets sent from applications continue to be transmitted to the relay server 214 for relaying to the other device while establishing the peer to peer network connection. When (and if) the peer to peer network connection is eventually established, virtual interface daemon can ensure that subsequent packets are sent using the peer to peer network connection, and the relay server 214 is not used to relay packets as long as the peer to peer network connection is available.

Note that, in some embodiments, applications 302-306 may not be involved in establishing and/or maintaining either the network connection to relay server 214, or the peer to peer network connection with the other electronic device. In these embodiments, applications 302-306 can simply forward their packets to operating system 300 for transmission, and the packets are managed by virtual interface daemon 502 as described above. This means that the operations for establishing and managing the network connections can be transparent to applications 302-306.

Route object 500 is a mechanism within virtual interface daemon 502 that maintains connection information for virtual interface daemon 502. Additionally, route object 500 determines when relay server 214 is being used to communicate packets to another device and start virtual interface daemon 502 in establishing the peer to peer network connection between electronic device 202 and the other device (e.g., electronic device 208). Although route object 500 is shown as part of virtual interface daemon, in some embodiments, route object 500 is separate from virtual interface daemon 502.

Transmitting Packets from an Electronic Device

Figure 6:
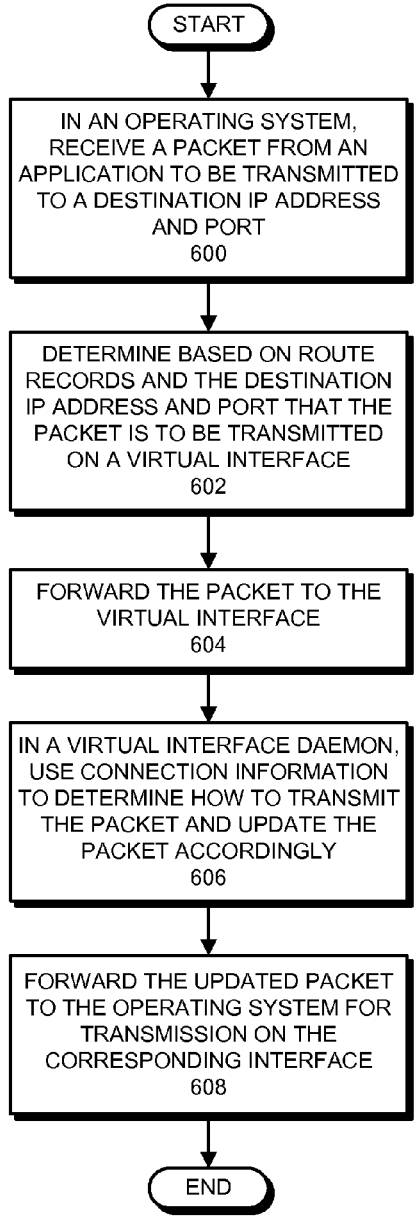
FIG. 6 presents a flowchart illustrating a process for transmitting packets in accordance with the described embodiments.

FIG. 6 presents a flowchart illustrating a process for transmitting packets in accordance with the described embodiments. The operations shown in FIG. 6 are performed by an electronic device such as electronic device 202 (which can include subsystems similar to exemplary electronic device 100). Specifically, operating system 300 and virtual interface daemon 502 in electronic device 202 perform operations for transmitting packets generated by an application (e.g., one of applications 302-306) from electronic device 202. Although we use electronic device 202 in the following description, electronic device 208 functions in a similar way.

The process shown in FIG. 6 starts when operating system 300 receives a packet from an application to be transmitted to a destination IP address and port (step 600). For example, operating system 300 can receive a packet from application 302 that is destined for electronic device 208 at an IP address and port known to application 302 for electronic device 208.

Operating system 300 then examines a route table maintained by operating system 300 and determines, based on route records in the route table and the destination IP address and port, that the packet is to be transmitted using a virtual interface (step 602). Recall that virtual interface daemon 502 is the actual destination of the virtual interface (i.e., the virtual interface does not actually transmit packets). Operating system 300 next forwards the packet to the virtual interface (step 604). Forwarding the packet to the virtual interface causes the packet to be sent to virtual interface daemon 502 for further processing.

Virtual interface daemon 502 then uses connection information in route object 500 to determine how to update the packet (step 606). In the described embodiments, determining how to update the packet comprises determining whether relay server 214 or the peer to peer network connection is being used to transmit the packets. Updating the packet comprises encapsulating the packet or altering one or more fields within the packet to indicate an IP address and port to which the packet is to be sent (i.e., altering the IP address and port to indicate the relay server when using the relay server or the other device when using the peer to peer network connection). Virtual interface daemon 502 then forwards the updated packet to operating system 300 for transmission using the corresponding interface in networking subsystem 106 (step 608).

Using virtual interface daemon 502 in this way can enable the switch from using relay server 214 to relay packets to electronic device 208 from electronic device 202 to using the peer to peer network connection. More specifically, virtual interface daemon 502 can determine that a peer to peer network connection has been successfully established between electronic devices 202 and 208 (as, e.g., shown in FIG. 8) and is therefore available for use, and can update the packets with information for the peer to peer connection when processing packets received from operating system 300. Then, when actually transmitting the updated packets, based on the updated information, operating system 300 sends the packets via the peer to peer connection.

Note that an application on electronic device 202 can be using relay server 214 to exchange packets with an application on electronic device 208 using IP addresses and port numbers that are specific to the communication session between those applications. When virtual interface daemon 502 on electronic device 202 subsequently switches to using the peer to peer network connection (i.e., after performing the operations to establish the peer to peer network connection), the IP addresses and port numbers used within the packets that are exchanged between the applications are unchanged. Thus, starting from a given layer of the network stack (e.g., the transport layer) up to the application layer, the packets may include the same IP addresses and port numbers, regardless of whether the packets are transferred between devices 202 and 208 using relay server 214 or using a peer to peer network connection. Using the same IP addresses and port numbers in this way enables the packets to be processed in the network stack and by the applications without requiring additional control and handling operations to be performed by those applications.

Additionally, although we describe "transmitting" a packet, receiving packets is handled similarly (albeit in reverse order) in the described embodiments. For example, electronic device 208 can receive a packet from electronic device 202 that was processed as described above (see FIG. 6) by operating system 300 and virtual interface daemon 502 in device 202 and then transmitted to electronic device 208. When electronic device 208 receives the packet, operating system 300 in electronic device 208 determines from information in the packet that the packet is to be handled by the virtual interface daemon 502 in electronic device 208. Operating system 300 in electronic device 208 then forwards the packet to virtual interface daemon 502 in electronic device 208 for processing. Virtual interface daemon 502 in electronic device 208 removes/reverses the above-described alterations and/or encapsulation performed by virtual interface daemon 502 in electronic device 202, thereby restoring the original properties of the packet sent by the application 302 in electronic device 202. Next, virtual interface daemon 502 in device 208 sends the restored packet back to operating system 300 in electronic device 208, so that the packet can be forwarded by operating system 300 to a destination application in electronic device 208.

Establishing a Network Connection and Registering with a Relay Server

Figure 7:
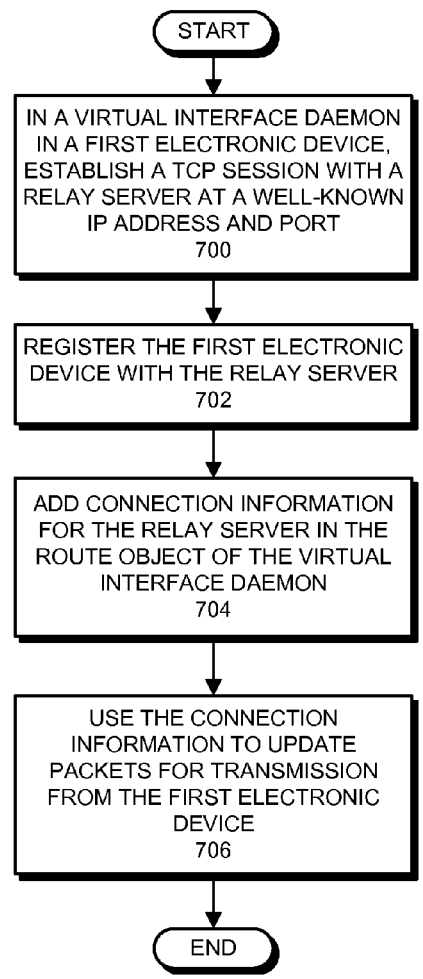
FIG. 7 presents a flowchart illustrating a process for establishing a network connection with a relay server in accordance with the described embodiments.

FIG. 7 presents a flowchart illustrating a process for establishing a network connection with relay server 214 in accordance with the described embodiments. The operations shown in FIG. 7 are performed by an electronic device such as electronic device 202. Specifically, an operating system 300 and a virtual interface daemon 502 that are being executed by a processing subsystem 102 in electronic device 202 establish a network connection to relay server 214. In some embodiments, establishing the network connection with relay server 214 (and subsequently relaying packets through relay server 214) follows at least some of the guidelines described in Request for Comments (RFC) 5766, *"Traversal Using Relays Around NATs"* (TURN), by the Internet Engineering Task Force (IETF).

In the described embodiments, the process shown in FIG. 7 starts when virtual interface daemon 502 in electronic device 202 establishes a TCP session with relay server 214 at a well-known IP address (e.g., looked up by a well-known hostname) and port (step 700). After establishing the TCP session, virtual interface daemon 502 registers electronic device 202 with relay server 214 (step 702). Registering electronic device 202 comprises negotiating an identifier, such as another IP address, with the relay server, and recording that IP address and information about the TCP connection in a memory in relay server 214.

After finishing registering electronic device 202 with relay server 214, virtual interface daemon 502 in electronic device 202 adds connection information for relay server 214 to route object 500 (step 704). Virtual interface daemon 502 subsequently uses the connection information to update packets for transmission from electronic device 202 to electronic device 208 (step 706). The operations of updating and transmitting packets are described in more detail with respect to, e.g., steps 606 and 608 in FIG. 6.

Establishing a Peer to Peer Network Connection

Figure 8:
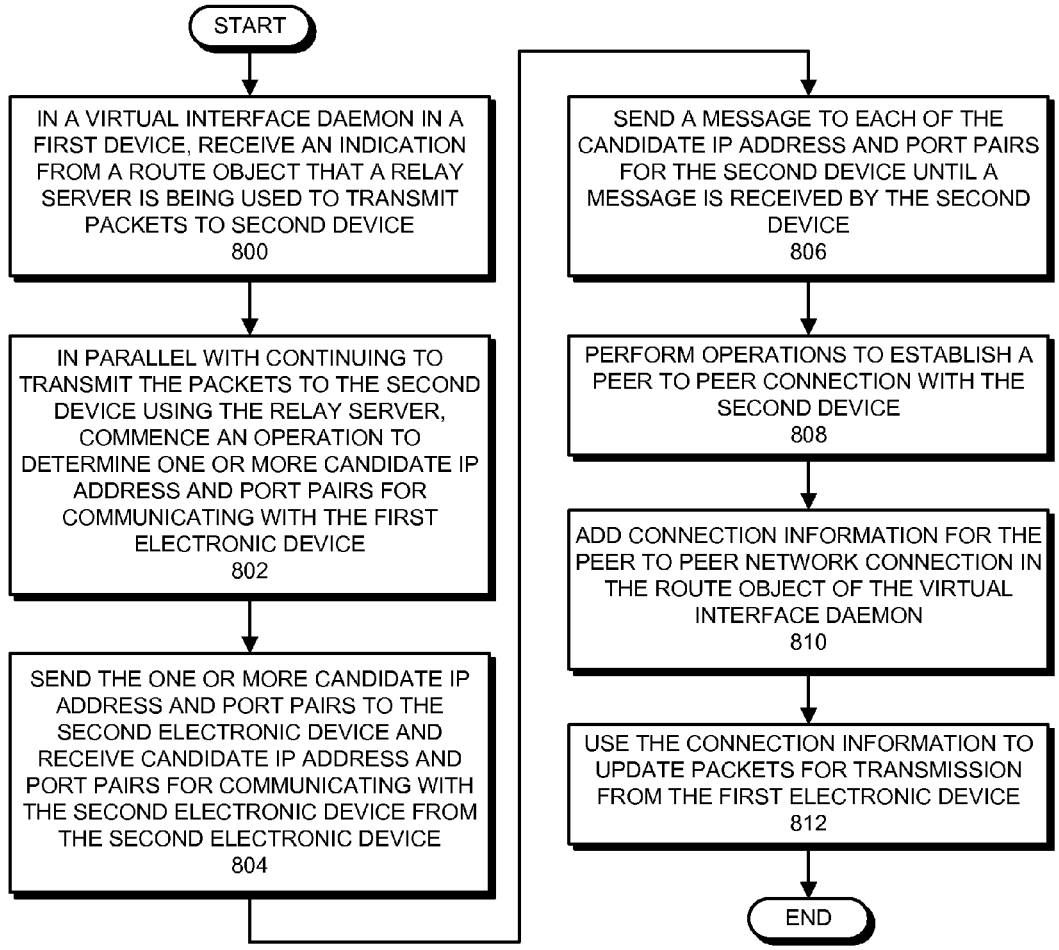
FIG. 8 presents a flowchart illustrating a process for establishing a peer to peer network connection in accordance with the described embodiments.

FIG. 8 presents a flowchart illustrating a process for establishing a peer to peer network connection in accordance with the described embodiments. The operations shown in FIG. 8 are performed by an electronic device such as electronic device 202. Specifically, an operating system 300 and a virtual interface daemon 502 that are being executed by a processing subsystem 102 in electronic device 202 are used to establish the peer to peer network connection.

The process shown in FIG. 8 starts when virtual interface daemon 502 in electronic device 202 receives an indication from route object 500 that relay server 214 is being used to transmit packets to electronic device 208 (step 800). Route object 500 monitors the packets generated by virtual interface daemon 502 to determine when packets that were generated by an application are being transmitted to relay server 214, and sends the indication when such packets are detected. (Transmitting packets using relay server 214 is described in more detail with respect to FIGS. 6-7.)

Next, in parallel with continuing to transmit data packets from electronic device 202 to electronic device 208 using relay server 214, virtual interface daemon 502 commences an operation to determine one or more candidate IP address and port pairs for communicating with electronic device 202 (step 802). In the described embodiments, determining the one or more candidate IP address and port pairs for communicating with electronic device 202 comprises sending one or more inquiries to address resolution server 216, which responds with candidate IP address and port pairs as described above, and/or querying operating system 300 for IP address and port pairs of electronic device 202 on network 206.

Next, virtual interface daemon 502 sends the one or more candidate IP address and port pairs to electronic device 208, and receives from electronic device 208 candidate IP address and port pairs for communicating with electronic device 208 (step 804). In the described embodiments, exchanging the candidate IP address and port pairs comprises using relay server 214 to perform the exchange.

Virtual interface daemon 502 in electronic device 202 then sends a message to each of the candidate IP address and port pairs for electronic device 208 until a message is received by electronic device 208 (step 806). In some embodiments, when electronic device 208 receives a message at a given candidate IP address and port pair, electronic device 208 returns an acknowledge message to electronic device 202. Note that, in parallel with electronic device 202 sending the message(s), electronic device 208 can send messages to the candidate IP address and port pairs received from electronic device 202. In this way, both devices can determine which (if any) of the candidate IP address and port pairs can be used to communicate with the other device using a peer to peer network connection.

Virtual interface daemon 502 next performs one or more operations to establish a peer to peer network connection with electronic device 208 using an IP address and port pair for which a message was able to get through to electronic device 208 (step 808). Although these operations can include any number of operations known in the art for establishing a peer to peer network connection, in some embodiments, these operations comprise establishing a UDP session between electronic devices 202 and 208, and negotiating message formatting and security parameters for packets communicated between the devices using the peer to peer network connection.

Virtual interface daemon 502 in electronic device 202 then adds connection information for the peer to peer network connection with electronic device 208 (i.e., the IP address and port that are to be used to communicate with electronic device 208) to route object 500 (step 810). Virtual interface daemon 502 subsequently uses the connection information to update packets for transmission from electronic device 202 to electronic device 208 (step 812). The operations of updating and transmitting packets are described in more detail with respect to, e.g., steps 606 and 608 in FIG. 6.

Configuring Network Connections

Figure 9:
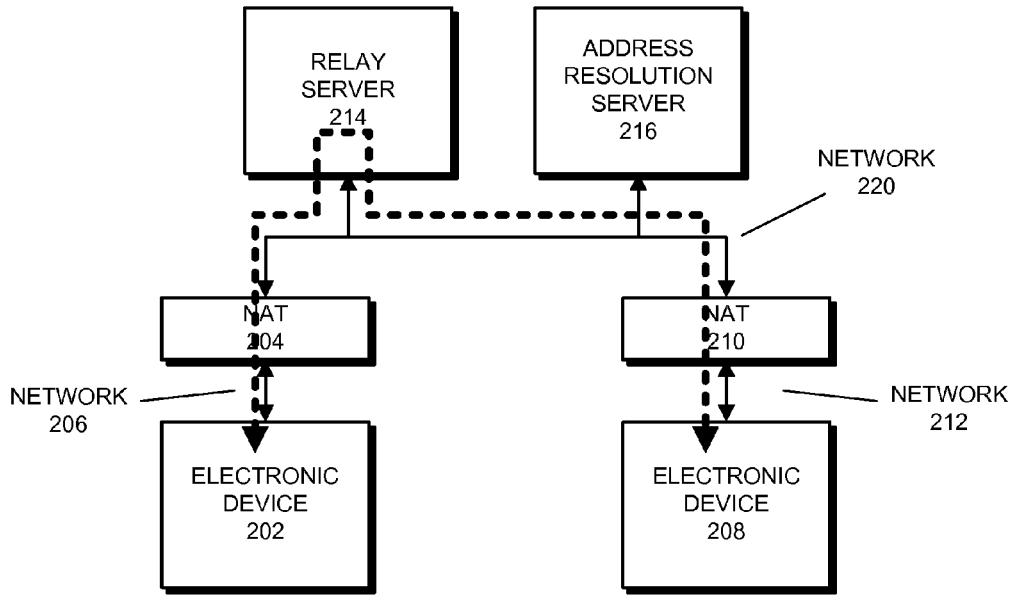
FIG. 9 presents a block diagram illustrating electronic devices using a relay server to communicate packets in accordance with the described embodiments.
Figure 10:
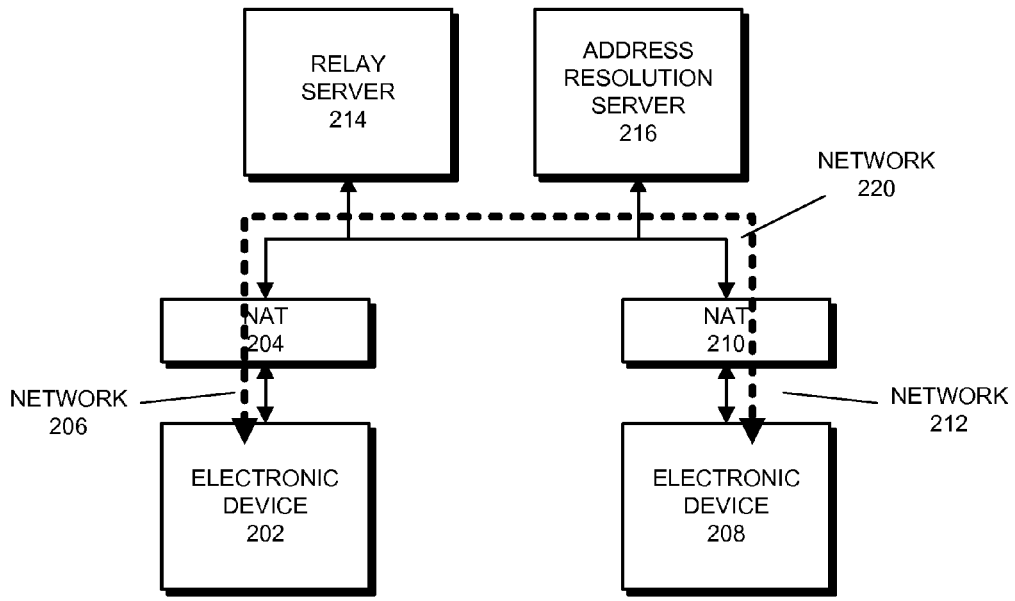
FIG. 10 presents a block diagram illustrating electronic devices using a peer to peer network connection to communicate packets in accordance with the described embodiments.

FIGS. 9-10 present block diagrams illustrating the configuration of network connections in accordance with the described embodiments. More specifically, FIG. 9 presents a block diagram illustrating electronic devices 202 and 208 using relay server 214 to communicate packets, and FIG. 10 presents a block diagram illustrating electronic devices 202 and 208 using a peer to peer network connection to communicate packets. As previously recited, the described embodiments can start out operating as shown in FIG. 9, but can determine that relay server 214 is being used to communicate packets, and can commence operations to establish a peer to peer network connection. If these operations are successful, the described embodiments can stop using relay server 214 to communicate packets, and can commence using the peer to peer network connection as is shown in FIG. 10.

Note that although the described embodiments can "stop" using the relay server to communicate packets, some embodiments need not entirely stop using the relay server. In some embodiments, certain types of packets can still be communicated between the devices using the relay server. Also, if the peer to peer network connection is lost (due to inactivity, etc.), the described embodiments can resume using the relay server for communicating packets.

ALTERNATIVE EMBODIMENTS

Although operating system 300 and virtual interface daemon 502 are described as an example, in some embodiments, some or all of the above-described function are implemented using different mechanisms. For example, in some embodiments, one or more separate integrated circuit chips perform the indicated operations. In these embodiments, the integrated circuit chips can include specialized circuits that implement some or all of the above-described operations, and/or can include general-purpose circuits that execute program code (e.g., firmware, etc.) that causes the circuits to perform the operations. In some embodiments, a combination of integrated circuit chips and processing subsystem 102 is used to implement the system. In some embodiments, the system includes multiple relay servers and/or multiple routes and/or information for multiple connections by which virtual interface daemon 502 might decide how to send a packet.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for establishing a network connection between electronic devices in a network, the method comprising:
   at a first electronic device that includes a processing subsystem,
   wherein the processing system is configured to execute an operating system for the first electronic device that comprises a kernel and an application space, and
   wherein the processing subsystem is further configured to execute a virtual interface daemon in the application space in the operating system, wherein the virtual interface daemon appears as a network interface to the operating system,
   the processing subsystem performing operations for the virtual interface daemon, the operations comprising:
      determining that a relay server is being used to send packets to and receive packets from a second electronic device;
      in parallel with continuing to send packets to and receive packets from the second electronic device using the relay server, performing operations to establish a peer to peer network connection with the second electronic device; and
      when the peer to peer network connection has been established, stopping using the relay server to send packets to and receive packets from the second electronic device, and instead using the peer to peer network connection with the second electronic device to send packets to and receive packets from the second electronic device;
      wherein sending packets using the relay server or the peer to peer network connection comprises, in the virtual interface daemon: receiving the packets from the kernel of the operating system, adding corresponding information to the packets to configure the packets to be sent using either the relay server or the peer to peer network connection, and returning the updated packets to the kernel of the operating system to be sent therefrom.

2. The method of claim 1, further comprising, before sending packets to and receiving packets from the second electronic device using the relay server, registering the first electronic device with the relay server, wherein the registration comprises:
   communicating an IP address and port of the first electronic device or an IP address and port of a NAT coupled between the first electronic device and the network to the relay server; and
   negotiating with the relay server an identifier for the first electronic device to enable the first electronic device to use the relay server to send packets to and receive packets from the second electronic device.

3. The method of claim 1, wherein performing operations to establish the peer to peer network connection with the second electronic device comprises:
   querying at least one of an address resolution server or the kernel of the operating system on the first electronic device to determine one or more candidate IP address and port pairs for communicating with the first electronic device using the peer to peer network connection;
   sending to the second electronic device the one or more candidate IP address and port pairs for communicating with the first electronic device;
   receiving from the second electronic device one or more candidate IP address and port pairs for communicating with the second electronic device using the peer to peer network connection; and
   exchanging test messages using the candidate IP address and port pairs for the first and second electronic devices until an IP address and port pair is found for each electronic device that can be used for communicating with the electronic device using the peer to peer network connection.

4. The method of claim 3, wherein performing operations to establish the peer to peer network connection with the second electronic device further comprises:
using the IP address and port pair that is found for the second electronic device, performing operations to establish a UDP session and configure one or more aspects of the UDP session, wherein the one or more aspects optionally include security aspects of the UDP session.

5. The method of claim 1, wherein the method further comprises, when performing operations to establish the peer to peer network connection with the second electronic device are unsuccessful, or when the peer to peer network connection with the second electronic device is lost:
continuing to or commencing sending packets to and receiving packets from the second electronic device using the relay server; and
after a predetermined time, performing operations to establish the peer to peer network connection with the second electronic device.

6. The method of claim 1, wherein using the peer to peer network connection with the second electronic device to send packets to and receive packets from the second electronic device comprises:
determining one or more session identifiers that were being used when sending packets to and receiving packets from the second electronic device using the relay server; and
using the session identifiers within the packets when sending packets to and receiving packets from the second electronic device using the peer to peer network connection.

7. The method of claim 1, wherein sending packets to the second electronic device using the relay server or the peer to peer network connection comprises:
receiving the packets in the kernel of the operating system in the first electronic device, wherein the packets comprise an indication that they are to be sent to the second electronic device;
based on the indication in the packets that the packets are to be sent to the second electronic device, forwarding the received packets from the kernel of the operating system to the virtual interface daemon;
in the virtual interface daemon, determining whether the relay server or the peer to peer network connection is being used to send packets to the second electronic device;
based on the determination, adding corresponding information to the packets to configure the packets to be transmitted to the second electronic device using either the relay server or the peer to peer network connection; and
forwarding the packets to the kernel of the operating system to be sent to the second electronic device using a corresponding interface in a networking subsystem.

8. The method of claim 7, wherein adding corresponding information to the packets to configure the packets to be transmitted to the second electronic device using the peer to peer network connection comprises:
adding one of UDP information, TCP information, or IP-in-IP information when the peer to peer network connection is being used.

9. The method of claim 7, wherein adding corresponding information to the packets to configure the packets to be transmitted to the second electronic device using the relay server comprises:
adding one of UDP information, TCP information, or IP-in-IP information when the relay server is being used.

10. The method of claim 1, wherein the packets are sent or received for at least one application that is being executed by the first electronic device.

11. A non-transitory computer-readable storage medium containing instructions that, when executed by a processing subsystem in a first electronic device, cause the first electronic device to perform a method for establishing a network connection between the first electronic device and a second electronic device in a network, the method comprising:
in the processing subsystem in the first electronic device,
wherein the processing system is configured to execute an operating system for the first electronic device that comprises a kernel and an application space, and
wherein the processing subsystem is further configured to execute a virtual interface daemon in the application space in the operating system, wherein the virtual interface daemon appears as a network interface to the operating system,
performing operations for the virtual interface daemon, the operations comprising:
determining that a relay server is being used to send packets to and receive packets from a second electronic device;
in parallel with continuing to send packets to and receive packets from the second electronic device using the relay server, performing operations to establish a peer to peer network connection with the second electronic device; and
when the peer to peer network connection has been established, stopping using the relay server to send packets to and receive packets from the second electronic device, and instead using the peer to peer network connection with the second electronic device to send packets to and receive packets from the second electronic device;
wherein sending packets using the relay server or the peer to peer network connection comprises, in the virtual interface daemon: receiving the packets from the kernel of the operating system, adding corresponding information to the packets to configure the packets to be sent using either the relay server or the peer to peer network connection, and returning the updated packets to the kernel of the operating system to be sent therefrom.

12. The computer-readable storage medium of claim 11, further comprising, before sending packets to and receiving packets from the second electronic device using the relay server, registering the first electronic device with the relay server, wherein the registration comprises:
communicating an IP address and port of the first electronic device or an IP address and port of a NAT coupled between the first electronic device and the network to the relay server; and
negotiating with the relay server an identifier for the first electronic device to enable the first electronic device to use the relay server to send packets to and receive packets from the second electronic device.

13. The computer-readable storage medium of claim 11, wherein performing operations to establish the peer to peer network connection with the second electronic device comprises:

querying at least one of an address resolution server or the kernel of the operating system on the first electronic device to determine one or more candidate IP address and port pairs for communicating with the first electronic device using the peer to peer network connection;

sending to the second electronic device the one or more candidate IP address and port pairs for communicating with the first electronic device;

receiving from the second electronic device one or more candidate IP address and port pairs for communicating with the second electronic device using the peer to peer network connection; and exchanging test messages using the candidate IP address and port pairs for the first and second electronic devices until an IP address and port pair is found for each electronic device that can be used for communicating with the electronic device using the peer to peer network connection.

14. The computer-readable storage medium of claim 13, wherein performing operations to establish the peer to peer network connection with the second electronic device further comprises:

using the IP address and port pair that is found for the second electronic device, performing operations to establish a UDP session and configure one or more aspects of the UDP session, wherein the one or more aspects optionally include security aspects of the UDP session.

15. The computer-readable storage medium of claim 11, wherein the method further comprises, when performing operations to establish the peer to peer network connection with the second electronic device are unsuccessful, or when the peer to peer network connection with the second electronic device is lost:

continuing to or commencing sending packets to and receiving packets from the second electronic device using the relay server; and after a predetermined time, performing operations to establish the peer to peer network connection with the second electronic device.

16. The computer-readable storage medium of claim 11, wherein using the peer to peer network connection with the second electronic device to send packets to and receive packets from the second electronic device comprises:

determining one or more session identifiers that were being used when sending packets to and receiving packets from the second electronic device using the relay server; and using the session identifiers within the packets when sending packets to and receiving packets from the second electronic device using the peer to peer network connection.

17. The computer-readable storage medium of claim 11, wherein sending packets to the second electronic device using the relay server or the peer to peer network connection comprises:

receiving the packets in the kernel of the operating system in the first electronic device, wherein the packets comprise an indication that they are to be sent to the second electronic device;

based on the indication in the packets that the packets are to be sent to the second electronic device, forwarding the received packets from the kernel of the operating system to the virtual interface daemon;

in the virtual interface daemon, determining whether the relay server or the peer to peer network connection is being used to send packets to the second electronic device;

based on the determination, adding corresponding information to the packets to configure the packets to be transmitted to the second electronic device using either the relay server or the peer to peer network connection; and forwarding the packets to the kernel of the operating system to be sent to the second electronic device using a corresponding interface in a networking subsystem.

18. The computer-readable storage medium of claim 17, wherein adding corresponding information to the packets to configure the packets to be transmitted to the second electronic device using the peer to peer network connection comprises:

adding one of UDP information, TCP information, or IP-in-IP information when the peer to peer network connection is being used.

19. The computer-readable storage medium of claim 17, wherein adding corresponding information to the packets to configure the packets to be transmitted to the second electronic device using the relay server comprises:

adding one of UDP information, TCP information, or IP-in-IP information when the relay server is being used.

20. The computer-readable storage medium of claim 11, wherein the packets are sent or received for at least one application that is being executed by the first electronic device.

21. A first electronic device, comprising:

a processing subsystem, wherein the processing system is configured to execute an operating system for the first electronic device that comprises a kernel and an application space, and wherein the processing subsystem is further configured to execute a virtual interface daemon in the application space in the operating system, wherein the virtual interface daemon appears as a network interface to the operating system, wherein the processing subsystem is further configured to perform operations for the virtual interface daemon, the operations comprising:

determining that a relay server is being used to send packets to and receive packets from a second electronic device;

in parallel with continuing to send packets to and receive packets from the second electronic device using the relay server, performing operations to establish a peer to peer network connection with the second electronic device; and when the peer to peer network connection has been established, stopping using the relay server to send packets to and receive packets from the second electronic device, and instead using the peer to peer network connection with the second electronic device to send packets to and receive packets from the second electronic device;

wherein sending packets using the relay server or the peer to peer network connection comprises, in the virtual interface daemon: receiving the packets from the kernel of the operating system, adding corresponding information to the packets to configure the packets to be sent using either the relay server or the peer to peer network connection, and returning the updated packets to the kernel of the operating system to be sent therefrom.

22. The apparatus of claim 21, wherein, before sending packets to and receiving packets from the second electronic device using the relay server, the first electronic device is configured to register the first electronic device with the relay server, wherein the registration comprises:
communicating an IP address and port of the first electronic device or an IP address and port of a NAT coupled between the first electronic device and the network to the relay server;
negotiating with the relay server an identifier for the first electronic device to enable the first electronic device to use the relay server to send packets to and receive packets from the second electronic device.

23. The apparatus of claim 21, wherein, when performing operations to establish the peer to peer network connection with the second electronic device, the first electronic device is configured to:
query at least one of an address resolution server or the kernel of the operating system on the first electronic device to determine one or more candidate IP address and port pairs for communicating with the first electronic device using the peer to peer network connection;
send to the second electronic device the one or more candidate IP address and port pairs for communicating with the first electronic device;
receive from the second electronic device one or more candidate IP address and port pairs for communicating with the second electronic device using the peer to peer network connection; and
exchange test messages using the candidate IP address and port pairs for the first and second electronic devices until an IP address and port pair is found for each electronic device that can be used for communicating with the electronic device using the peer to peer network connection.

24. The apparatus of claim 23, wherein, when performing operations to establish the peer to peer network connection with the second electronic device, using the IP address and port pair that is found for the second electronic device, the first electronic device is configured to:
perform operations to establish a UDP session and configure one or more aspects of the UDP session, wherein the one or more aspects optionally include security aspects of the UDP session.

25. The apparatus of claim 21, wherein, when performing operations to establish the peer to peer network connection with the second electronic device are unsuccessful, or when the peer to peer network connection with the second electronic device is lost, the first electronic device is configured to:
continue to or commence sending packets to and receiving packets from the second electronic device using the relay server; and
after a predetermined time, perform operations to establish the peer to peer network connection with the second electronic device.

26. The apparatus of claim 21, wherein, when using the peer to peer network connection with the second electronic device to send packets to and receive packets from the second electronic device, the first electronic device is configured to:
determine one or more session identifiers that were being used when sending packets to and receiving packets from the second electronic device using the relay server; and
use the session identifiers within the packets when sending packets to and receiving packets from the second electronic device using the peer to peer network connection.

27. The apparatus of claim 21, wherein, when sending packets to the second electronic device using the relay server or the peer to peer network connection, the first electronic device is configured to:
receive the packets in the kernel of the operating system in the first electronic device, wherein the packets comprise an indication that they are to be sent to the second electronic device;
based on the indication in the packets that the packets are to be sent to the second electronic device, forward the received packets from the kernel of the operating system to the virtual interface daemon;
in the virtual interface daemon, determine whether the relay server or the peer to peer network connection is being used to send packets to the second electronic device;
based on the determination, add corresponding information to the packets to configure the packets to be transmitted to the second electronic device using either the relay server or the peer to peer network connection; and
forward the packets to the kernel of the operating system to be sent to the second electronic device using a corresponding interface in a networking subsystem.

28. The apparatus of claim 27, wherein, when adding corresponding information to the packets to configure the packets to be transmitted to the second electronic device using the peer to peer network connection, the first electronic device is configured to:
add one of UDP information, TCP information, or IP-in-IP information when the peer to peer network connection is being used.

29. The apparatus of claim 27, wherein, when adding corresponding information to the packets to configure the packets to be transmitted to the second electronic device using the relay server, the first electronic device is configured to:
add one of UDP information, TCP information, or IP-in-IP information when the relay server is being used.

30. The apparatus of claim 21, wherein the packets are sent or received for at least one application that is being executed by the first electronic device.

* * * * *